United States Patent
Malik

(10) Patent No.: US 7,447,756 B2
(45) Date of Patent: Nov. 4, 2008

(54) TEMPORARY ALIASING FOR RESOURCE LIST

(75) Inventor: Dale W. Malik, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 776 days.

(21) Appl. No.: 10/217,915

(22) Filed: Aug. 13, 2002

(65) Prior Publication Data

US 2003/0220977 A1    Nov. 27, 2003

Related U.S. Application Data

(60) Provisional application No. 60/382,106, filed on May 21, 2002.

(51) Int. Cl.
G06F 15/16 (2006.01)
G06F 15/173 (2006.01)
G06F 9/44 (2006.01)
G06F 3/00 (2006.01)

(52) U.S. Cl. .............. 709/223; 709/204; 709/224; 709/228; 715/705; 717/125

(58) Field of Classification Search ............ 709/204, 709/223, 224, 228; 715/705; 717/125
See application file for complete search history.

(56) References Cited

U.S. PATENT DOCUMENTS

| | | | | |
|---|---|---|---|---|
| 5,058,152 | A | 10/1991 | Solomon et al. | 379/67 |
| 5,361,295 | A | 11/1994 | Solomon et al. | 379/67 |
| 5,590,184 | A | 12/1996 | London | 379/142 |
| 5,742,905 | A | 4/1998 | Pepe et al. | 455/461 |
| 5,952,934 | A | 9/1999 | Matsumoto et al. | 340/825.52 |
| 6,047,056 | A | 4/2000 | Patel | 379/207 |
| 6,272,214 | B1 | 8/2001 | Jonsson | 379/202 |
| 6,327,353 | B1 | 12/2001 | Fukuzawa et al. | 379/201.01 |
| 6,332,163 | B1 | 12/2001 | Bowman-Amuah | 709/231 |
| 6,393,424 | B1 | 5/2002 | Hallman | |
| 6,445,780 | B1 | 9/2002 | Rosset et al. | 379/114.17 |
| 6,463,471 | B1 | 10/2002 | Dreke | |
| 6,480,885 | B1 | 11/2002 | Olivier | |
| 6,513,013 | B1 * | 1/2003 | Stephanou | 705/9 |
| 6,519,628 | B1 * | 2/2003 | Locascio | 709/204 |
| 6,571,286 | B2 * | 5/2003 | Fisher et al. | 709/224 |
| 6,611,498 | B1 * | 8/2003 | Baker et al. | 370/252 |

(Continued)

OTHER PUBLICATIONS

Hamilton, M. and Wright, R. "Use of DNS Aliases for Network Services," RFC 2219, Oct. 1997, pp. 1-8.*

(Continued)

*Primary Examiner*—Jason Cardone
*Assistant Examiner*—Melvin H Pollack
(74) *Attorney, Agent, or Firm*—Thomas, Kayden, Horstemeyer & Risley, LLP

(57) ABSTRACT

A system for temporary aliasing is provided. A representative system includes a database system operable to store a plurality of network profiles, each network profile being associated with a user. The database system being further operable to provide a first user with a temporary alias to allow addition of the temporary alias to a network profile associated with a second user. The system further includes a service manager coupled to the database system and operable to remove the temporary alias from the network profile of the second user. Methods and other systems for temporary aliasing are also provided.

34 Claims, 5 Drawing Sheets

U.S. PATENT DOCUMENTS

| | | | |
|---|---|---|---|
| 6,691,113 | B1 | 2/2004 | Harrison |
| 6,879,994 | B1* | 4/2005 | Matsliach et al. ............ 709/204 |
| 6,973,481 | B2* | 12/2005 | MacIntosh et al. ........... 709/206 |
| 6,983,317 | B1* | 1/2006 | Bishop et al. ................ 709/223 |
| 7,003,558 | B2* | 2/2006 | Agrusa et al. ............... 709/223 |
| 7,092,992 | B1 | 8/2006 | Yu |
| 7,167,918 | B2* | 1/2007 | Byrne et al. ................. 709/229 |
| 2002/0099832 | A1* | 7/2002 | Yaegerman et al. ......... 709/228 |
| 2002/0165815 | A1* | 11/2002 | Vincent ........................ 705/37 |
| 2002/0173306 | A1 | 11/2002 | Adamany et al. ............ 455/432 |
| 2003/0018726 | A1 | 1/2003 | Low |
| 2003/0018765 | A1* | 1/2003 | Muhlestein et al. .......... 709/223 |
| 2003/0028599 | A1* | 2/2003 | Kolsky ......................... 709/206 |
| 2003/0126245 | A1* | 7/2003 | Feltin et al. .................. 709/223 |
| 2003/0200299 | A1* | 10/2003 | Jamison ....................... 709/223 |
| 2004/0101123 | A1 | 5/2004 | Garcia ................... 379/220.01 |
| 2004/0243844 | A1 | 12/2004 | Adkins |

OTHER PUBLICATIONS

Zorn, G. and Aboba, B. "Radius Authentication Server MIB," RFC 2619, Jun. 1999, pp. 1-16.*

Rigney, C. et al. "Remote Authentication Dial In User Service (Radius)," RFC 2865, Jun. 2000, pp. 1-76.*

Patent Application entitled: Instant Messaging Architecture and System for Interoperability and Presence Management; filed Apr. 29, 2002; U.S. Appl. No. 10/135,929.

Malik; U.S. Appl. No. 10/217,390, filed Aug. 13, 2002.

Malik; U.S. Appl. No. 11/422,280, filed Jun. 5, 2006.

Sheha; U.S. Appl. No. 60/360,737, filed Mar. 1, 2002.

Malik; Non-Final Rejection mailed Jul. 30, 2003 for U.S. Appl. No. 10/217,390, filed Aug. 13, 2002.

Malik; Final Rejection mailed Jan. 22, 2004 for U.S. Appl. No. 10/217,390, filed Aug. 13, 2002.

Malik; Examiner Interview Summary Record mailed Feb. 9, 2004 for U.S. Appl. No. 10/217,390, filed Aug. 13, 2002.

Malik; Advisory Action mailed Apr. 7, 2004 for U.S. Appl. No. 10/217,390, filed Aug. 13, 2002.

Malik; Non-Final Rejection mailed Aug. 3, 2004 for U.S. Appl. No. 10/217,390, filed Aug. 13, 2002.

Malik; Final Rejection mailed May 19, 2005 for U.S. Appl. No. 10/217,390, filed Aug. 13, 2002.

Malik; Non-Final Rejection mailed Nov. 30, 2005 for U.S. Appl. No. 10/217,390, filed Aug. 13, 2002.

Malik; Examiner Interview Summary Record mailed Apr. 3, 2006 for U.S. Appl. No. 10/217,390, filed Aug. 13, 2002.

Malik; Notice of Allowance and Fees Due mailed Apr. 30, 2006 for U.S. Appl. No. 10/217,390, filed Aug. 13, 2002.

Malik; Non-Final Rejection mailed Jan. 10, 2008 for U.S. Appl. No. 11/422,280, filed Jun. 5, 2006.

Malik; Examiner Interview Summary Record mailed Apr. 10, 2008 for U.S. Appl. No. 11/422,280, filed Jun. 5, 2006.

* cited by examiner

TEMPORARY ALIASING FOR RESOURCE LIST

CROSS-REFERENCE TO RELATED APPLICATION

This application claims priority to copending U.S. provisional application entitled, "INTEGRATION OF INSTANT MESSAGING AND COMPUTER OPERATING SYSTEMS," having Ser. No. 60/382,106, filed May 21, 2002, which is entirely incorporated herein by reference.

FIELD OF THE INVENTION

The present invention is generally related to telecommunications and more particularly to services provided to clients via instant messaging applications.

DESCRIPTION OF THE RELATED ART

The development of the internet has driven vast technological developments, particularly in the areas of networking hardware and software. Networking hardware developments have enabled networks to transfer large files in fractions of a second. Software developments, such as the world-wide-web (web) and e-mail, have facilitated communications over these networks that have allowed users to remain in almost constant contact with work. These types of communications have become of utmost importance in the business setting, where response time has become a key survival factor for many companies. Other networking software has allowed users to access and run applications from remote locations, thus enabling a businessperson to remain more productive, even on a business trip.

Moreover, the internet has changed the way people communicate. E-mail has become the dominant means of communications in many settings, being preferred over traditional mail, and even telephones in some cases. Almost instantaneous communication with little charge has driven much of the popularity of e-mail. Once used only in university and military settings, e-mail has gained widespread public acceptance.

In a world economy based largely upon communication, the relative speed of e-mail in comparison to traditional mail is often not fast enough or as effective. Demand for faster access to more information has resulted in the development of a number of instant messaging (IM) services. IM brings presence information into the communications arena, and it allows users to have real-time chat sessions with other users who are present on the system. The real-time nature of IM has led to quick acceptance by many in the business community of IM as an invaluable tool for communication. However, current IM systems often have administration and management problems.

Therefore, there is a need for systems and method that address these and/or other perceived shortcomings of the prior art.

SUMMARY OF THE INVENTION

One embodiment of the present invention provides systems and methods for providing temporary aliasing. A representative system includes a database system operable to store a plurality of profiles, each profile being associated with a user. The database system being further operable to provide a first user with a temporary alias to allow addition of the temporary alias to a profile associated with a second user. The system further includes a service manager coupled to the database system and operable to remove the temporary alias from the profile of the second user.

A method for temporary aliasing includes: creating a temporary alias associated with a username of a first user; providing a second user with the temporary alias to be stored in a profile associated with the second user; and deleting the temporary alias from the profile.

A method to interact with clients includes: receiving a service call from a client; creating a temporary alias with an expiration date; and sending the temporary alias to the client.

Other systems, methods, features, and advantages of the present invention will be or become apparent to one with skill in the art upon examination of the following drawings and detailed description. It is intended that all such additional systems, methods, features, and advantages included within this description and within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

The preferred embodiments of the present invention now will be described more fully with reference to the accompanying drawings. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

Figure 1A:
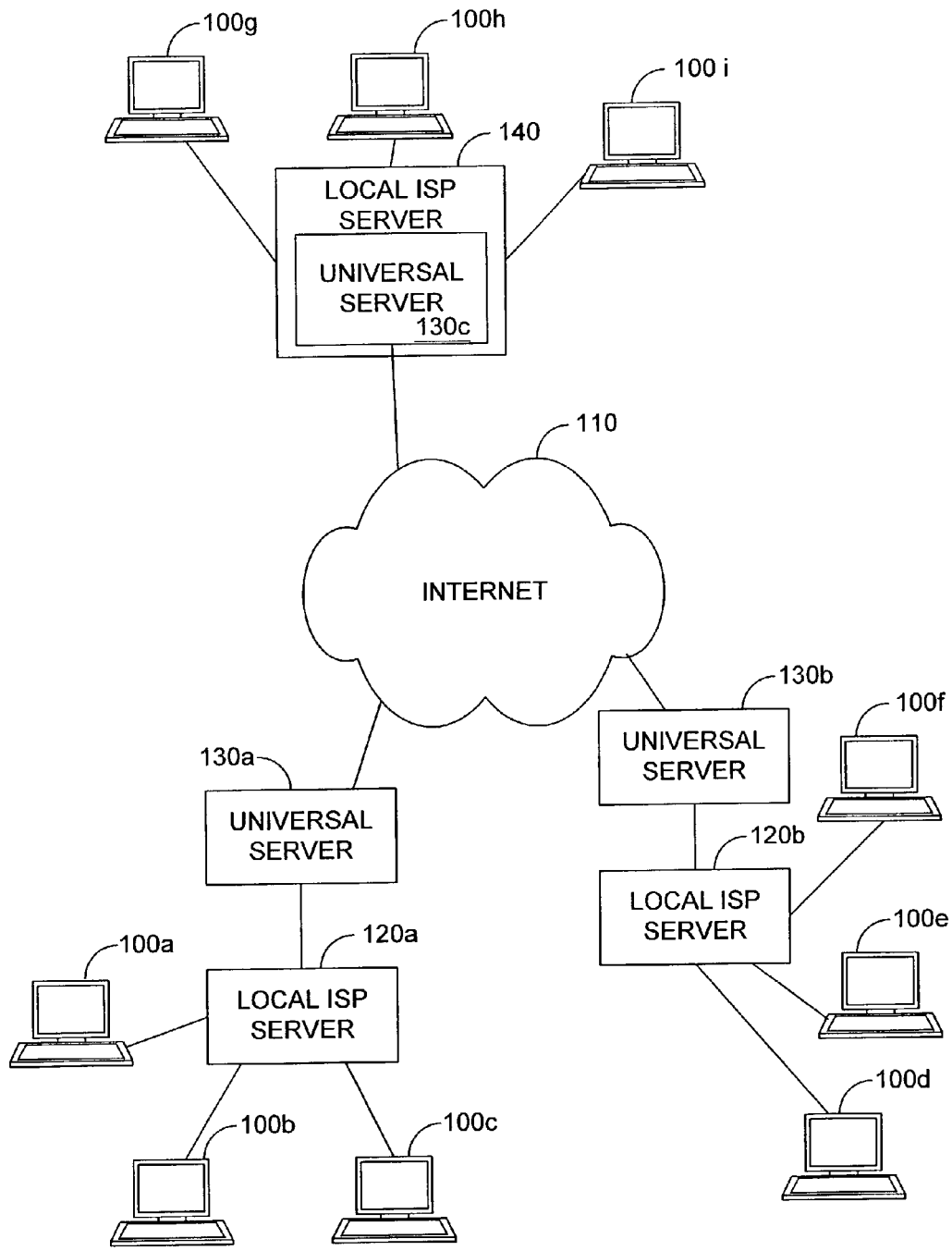
FIG. 1A is a block diagram illustrating an interoperability architecture for instant messaging used in one embodiment, among others, of the present invention.

Referring now to FIG. 1A, shown is a block diagram illustrating an interoperability architecture for instant messaging used in one embodiment, among others, of the present invention. Each of a plurality of remote computers 100a-i access a network 110 through a local internet service provider (ISP) server 120a, 120b, 140. The local ISP 120a, 120b, 140 can offer network 110 access through myriad connection types, including a digital subscriber line (DSL) service, an integrated services digital network (ISDN) service, an analog dial-up service, ethernet, T-1, or any other service for transmitting data through a network 110. Universal servers 130a-c are located between the internet and each of local ISP servers 120a, 120b, and located inside local ISP 140. These universal servers 130a-c provide interoperability between a plurality of proprietary instant messaging clients 100a-i. Of course, the scope of the presentation includes networks other than those with universal servers or instant messaging.

Figure 1B:
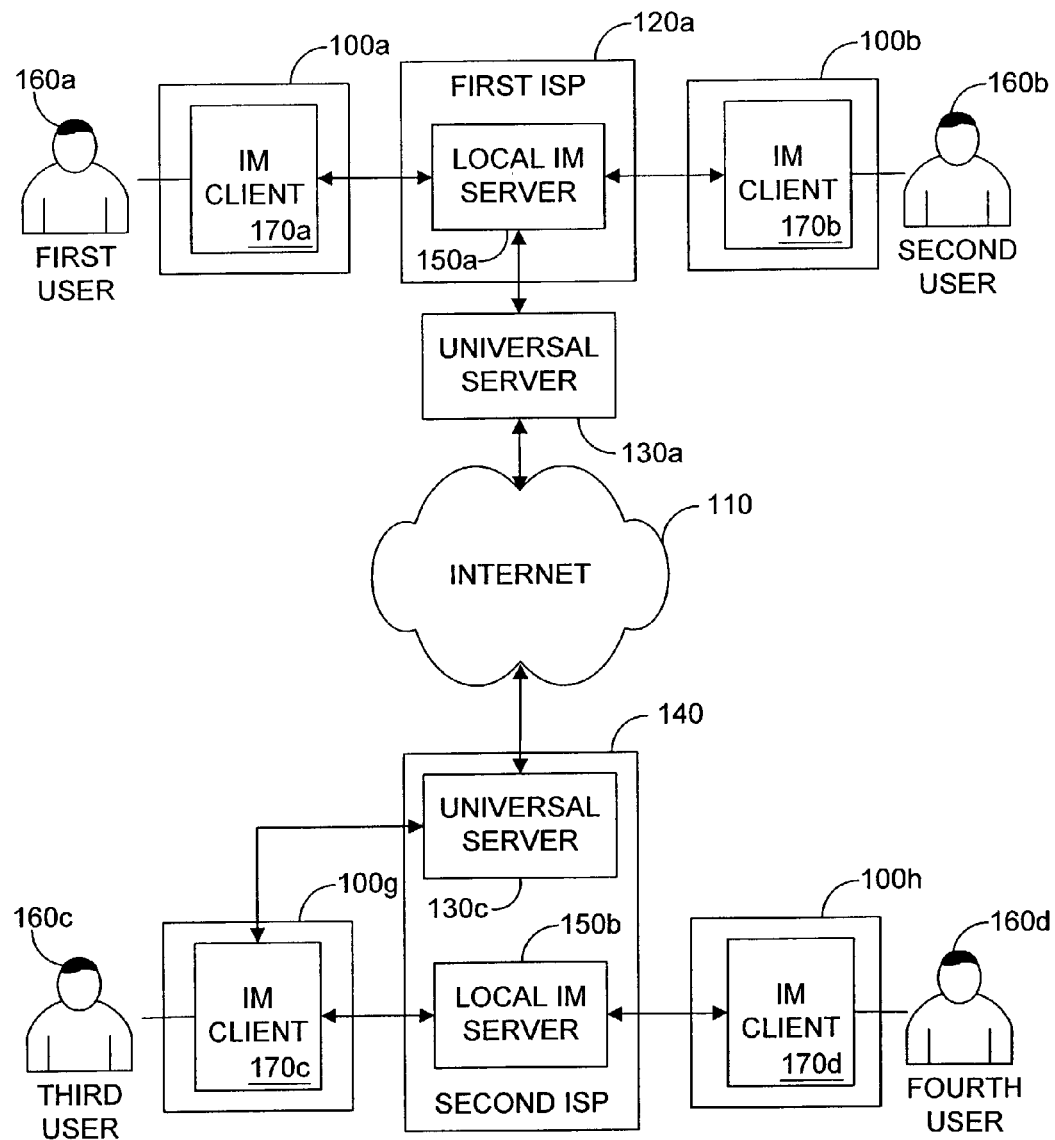
FIG. 1B is a block diagram illustrating an alternative embodiment, among others of an interoperability architecture for instant messaging used in one embodiment, among others, of the present invention.

Referring now to FIG. 1B, shown is an illustration of an alternative embodiment, among others, of a universal architecture. Greater detail regarding this interoperability architecture may be found in U.S. patent application Ser. No. 10/135,929, entitled "Instant Messaging Architecture and System for Interoperability and Presence Management," which is hereby incorporated by reference. The universal architecture uses a universal protocol, such as the extensible markup language (XML) protocol to allow users of different ISPs 120a, 140 that use proprietary protocols to communicate with one another. Universal servers 130a, 130c located at each of the ISPs 120a, 140 are the key feature of the universal architecture. FIG. 1B illustrates two separate ISP networks 120a, 140. The discussion of the ISP 120a, 140 will be limited to the components that provide the universal service.

The ISP 120a contains a local IM server 150a, and is connected to the universal server 130a. The local IM server 150a provides the standard IM function for the ISP 140a. The universal server 130a provides the universal function that allows the first user 160a, who is registered with the first ISP 120a, to communicate with a second user 160b registered with the second ISP 140. The first ISP 120a provides connections to a plurality of clients 170a, 170b on computers 100a, 100b, which allows users 160a, 160b to access the proprietary IM and universal functions of the ISP 120a. The first ISP 120a is "bimodal," in that it uses both a proprietary and universal format to provide a proprietary IM function that only allows the users who are registered with the ISP 120a to send and receive instant messages. For example, if only one user has registered with the universal server 130a, then the local IM server 150a will transfer instant messages between the first and second users 160a, 160b using the proprietary protocol. However, if both the first and second users 160a, 160b are registered with the universal server 130a, then the first ISP 120a can transfer instant messages between them using the universal protocol. By supporting both formats at the first ISP 120a, users can migrate to the universal format over time. When all users 160a, 160b have migrated the proprietary format can be discontinued.

The universal server 130a removes the restrictions associated with proprietary IM functions associated with the ISP 120a. The universal server 130a uses a universal format, such as XML, or any other suitable format, that allows users 160a, 160b registered with an ISP 140a, such as BellSouth DotNet, to send and receive instant messages from other users 160c, 160d registered with another ISP 140b, such as America Online (AOL).

The user 160a accesses the local IM server 150a of the ISP 120a through the IM client 170a located on the user's computer 100a. The IM client 170a typically includes a proprietary software program that is capable of opening communications sockets that allow the IM client 170a to communicate with the local IM server 150a using either the proprietary or universal protocols. The software program is capable of formatting an instant message sent from the IM client 170a to the appropriate format used by the IM function of the ISP 120a. In this manner, the user 170a is capable of communicating with any other user 160b registered with the ISP 120a. However, the local IM server 150a on a first ISP 120a is also connected to a first universal server 130a. The first universal server 130a is in turn, connected to a second universal server 130b on the second ISP 140b via a distributed network, such as the internet 110. This allows the user 160a to communicate not only with the user 160b who is registered with the first ISP 120a, but also with users 160c who are registered with the second ISP 140 that uses a different proprietary IM protocol to send and receive instant messages within the network of the second ISP 140.

In order for the first user 160a to be able to send and receive messages with a third user 160c on the second ISP 140, the IM client 170a must be able to identify the IP address and presence information associated with the third user 160c. The presence information for the third user 160c is stored on the universal server 130a connected to the first ISP 120a. The universal server 130a on the first ISP 120a stores the IP address and presence information for the third user 160c. Therefore, the first user 160a, who is registered with the universal server 130a on the first ISP 120a has access to the IP address and presence information of the third user 160c.

One skilled in the art will recognize the difference between the first local ISP 120a and the second ISP 140. The second local ISP 140 is an alternative embodiment that includes within the ISP 140 both the universal server 130c and a local IM server 150b. Here, the local IM server 150b does not communicate with the universal server 130c. Thus, the first user 160a will not be able to communicate with a fourth user 160d if the fourth user 160d is not registered with the universal server 130b, but instead is only registered with a local IM server 150b. As a result, the fourth user 160d is able to send and receive instant messages using only the proprietary format over local IM server 150b. Therefore, the user 160d is limited to communicating via instant messages with users of the second ISP 140b, such as the third user 160c.

An advantageous feature of the universal architecture is that it is designed to be easily integrated within existing ISPs 120a, 140, such as AOL and Microsoft Network (MSN) without disrupting the current IM function of these ISPs 120a, 140. Each ISP 120a, 140 that adopts the universal architecture requires only a slight modification to the existing network. The ISP 120a, 140 either adds a universal server 130a between the local IM server 150a and the internet 110, or adds an additional server to function as the universal server 130b and can install a universal application program on the local IM server 150a, 150b and each IM client 170a-d attached to the network. The universal application program that is installed at each ISP 120a, 140 converts the ISP 120a, 140 to function as "bimodal." That is, the ISP 120a, 140 is capable of using the proprietary IM protocol of the local IM server 150a, 150b and the universal protocol of the universal architecture. The bimodal nature of the universal architecture allows the universal server 130a, 130b to be implemented into existing ISPs 120a, 140 such as AOL and MSN without disrupting the current proprietary IM functions of those services. This allows the current users 160a-d to continue using the proprietary IM function of their particular ISP 120a, 140 until every user 160a-d can be converted to the universal protocol.

Figure 2:
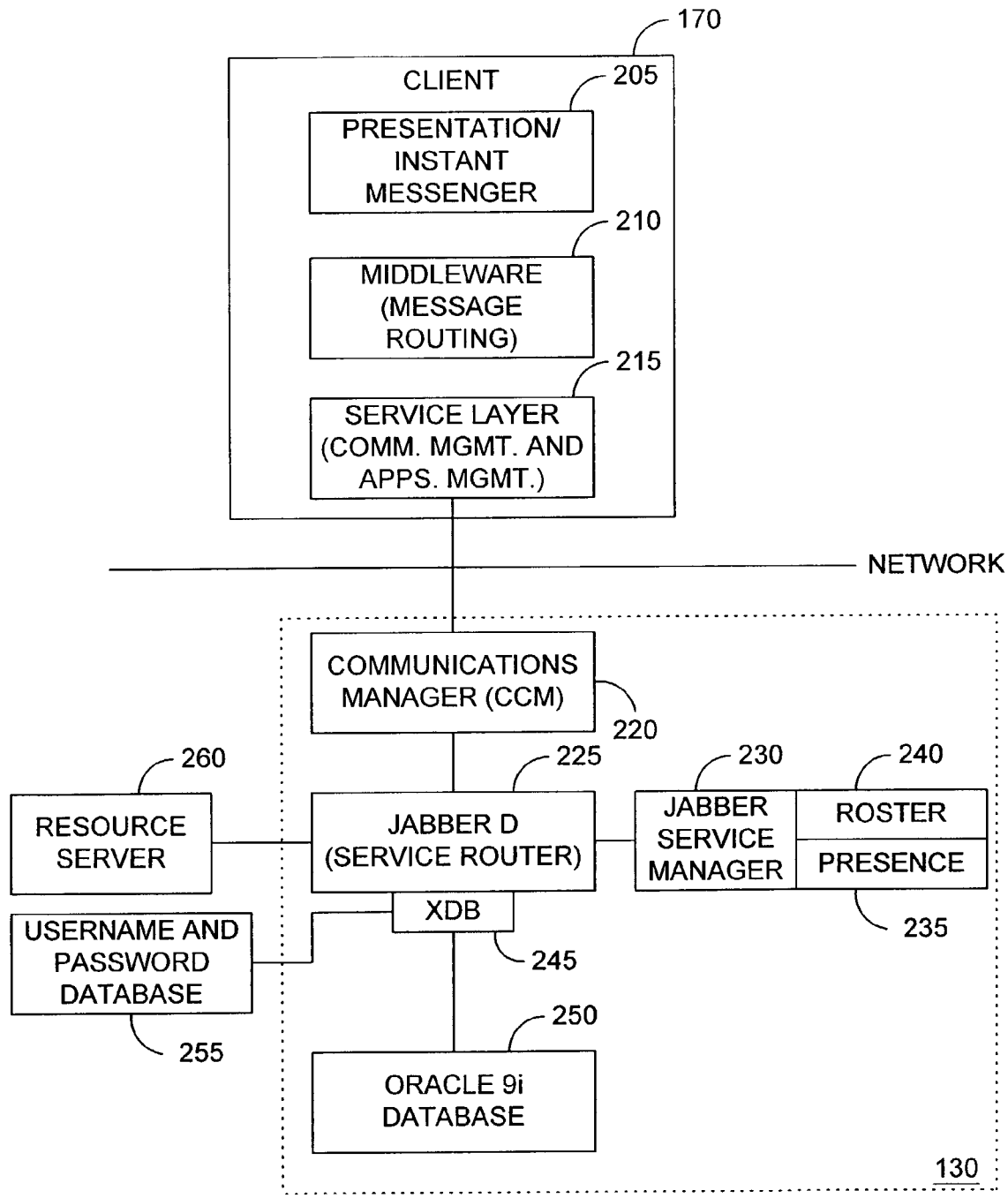
FIG. 2 is a block diagram of the interoperability architecture used in one embodiment, among others, of the present invention.

Referring now to FIG. 2, shown is a block diagram illustrating an embodiment, among others, of the universal server 130 of FIGS. 1A & B, which is used in conjunction with an embodiment, among others, of the present invention. The client 170 includes at least three layers of functionality in one embodiment, among others, to communicate with the universal server 130. The first layer is the presentation layer 205. The presentation layer 205 includes the logic that is used to present the instant messenger or another application to a user. The second layer is a middleware layer 210. The middleware layer 210 includes logic used to handle the message routing of the instant messaging application between the presentation layer and the service layer. The third layer is the service layer 215. The service layer 215 handles both the applications management and communications management of the client. The service layer 215 communicates with the communications layer 220 on the universal server 130.

Preferably, there are three basic layers to the instant messaging service. The first layer is the communications manager (CCM) 220. The communications manager 220 manages the connections between the client communications manager 215 and the universal server 130. In one embodiment, among others, of the universal server 130, communications between the client service layer 215 and the universal server 130 communications manager 220 occur in extensible markup language (XML). Further, the communications may be secure socket layer (SSL) encrypted for security. Moreover, the communications can be compressed by a compression/decompression algorithm implemented on a compression-decompression module, more commonly referred to as a CODEC, to provide faster data transfer.

The communications manager 220 includes a number of connection sockets between the communications manager 220 and a plurality of users. The communications manager 220 can further include a load balancer (not shown) to balance the connections over a number of different communications managers. The load balancer can maintain a connection to the same connection socket during the period while the user is logged on and connected to an operable communications manager 220, and can automatically connect the user to an alternate connection socket when a communications manager might fail. Thus, a continuous connection can be maintained during an active session despite hardware failures. The load balancer can also protect the server against denial of service attacks, which have become increasingly prevalent on the internet.

A standard communications manager 220 will typically attempt to recover and reallocate a connection socket after a period of time with no activity from the client 170. In this situation the communications manager 220 assumes that the client is no longer present on the system. However, because presence is an important piece of the instant messaging architecture, the communications layer 215 on the client-side sends a signal to the universal server 130 to keep the connection socket active on the communications manager 220.

The second layer is the service router 225, with one example known as a JabberD in the Jabber architecture, such as that available from Jabber, Inc. of Denver, Colo., which performs a similar function to the message router 210 on the client side of the network. A number of different service managers 230 can be coupled to the service router 225, each of which can provide a different service to the client 170 over the internet. Thus when a service is requested, the service router 225 routes the request to the requested service manager 230. In the instant messaging architecture the service manager 230 is a Jabber service manager (JSM) which allows text communication between parties. The JSM 230 also keeps track of presence and roster information 235, 240, respectively, for a particular user on the network who has logged into the instant messaging system. Presence 235 typically refers to the user's status on the network, while roster 240 typically refers to the status on the network of those on the user's resource list.

Similarly to the communications manager 220, the service router 225 can utilize a self-similar architecture using the CODEC (not shown) and load balancer (not shown) to optimize the connection between the communications manager 220 and the service router 225. Use of the CODEC enables high speed data transmission between the communications manager 220 and the service router 225. The load balancer provides a robustness that allows the client to maintain contact with a selected service manager 230 during a session.

In one embodiment, among others, of the universal server 130, the database containing the non-persistent data, such as presence and roster information 235, 240, can be severed from the service manager 230. The presence information 235 typically includes a list of all users who are registered with the universal server 130, while the roster list includes a non-persistent list of those resource which are present on the network. Thus, the non-persistent data can be maintained and updated at a single database, and the plurality of service routers 225 can connect to the same presence information 235. After severing this database from the service manager 230 the service manager 230 can be equipped, as described above, with a CODEC (not shown) and load balancer (not shown), again utilizing a self-similar architecture to provide quality of service and communication efficiencies.

The service router 225 is further coupled, in one embodiment, among others, to an XML database (XDB) library 245. The XDB library 245 is used as a translator such that the service router 225 can communicate with a database system 250' that includes persistent data relating to a plurality of clients. The database system 250 which contains most of the persistent data for the services on the network, such as resource lists, preferences, etc. In one embodiment, among others, of the universal server 130 the database system 250 can be an Oracle 9*i* database. The XDB library 245 can be further coupled to an authentication server, such as a username and password database 255. Thus a username and password can be required before the user is authenticated and allowed to access the database system 250 for any profile information.

After registering with the database system 250, the user is provided with a resource list. The client 170 can then contact the service manager 230 to find out which of the resources on the resource list is present and/or available on the network. Typically, presence refers to the registration state of a client 170. If a client 170 is logged-in to the network, the client 170 is present on the network. Typically, availability refers to the status of a user at the client computer. A user can be made unavailable by the network if there has been no activity on the client computer 170 for a period of time. Otherwise, a client 170 can be made unavailable by user choice, if the user does not wish to be disturbed. One skilled in the art will recognize that these are merely definitions of various states that can be defined according to any specific implementation of the presence and roster databases 235, 240. Furthermore, these databases 235, 240 that contain non-persistent information could keep track of any other states that might be defined by the specific implementation of the service manager 230.

Typically with respect to other instant messaging systems, the resource list only comprises a list of other users for which the client 170 wishes to know the status. However, the resource list of some embodiments of the present invention could include access to a plurality of applications, and there could be multiple service managers that include managers for the plurality of applications coupled to the service router 225. These service managers could provide access to a multitude of different applications and resources, such as Microsoft Word and/or Visio, provided by Microsoft Corp. of Redmond, Wash., and/or billing entry applications, etc. Moreover, the Jabber service manager 230 could keep track of the presence of these other applications and other resources on the network. For example, if a client wished to access an e-mail account from a remote location and the system was down, the Jabber service manager 230 could alert the user that the server was down. Thus the client 170 would not waste resources searching and waiting for e-mail from a server that is off-line.

Thus, Jabber can be used similarly to an operating system. When a resource server 260 is present on the network, the resource(s) associated with that resource server can be displayed as an icon on the client computer display, and when a resource server is down, the resource(s) can be removed from the client computer 170 display. Thus, icons, for example, could appear and disappear from a client computer 170 display as they become present and available, and not present or unavailable. Selecting the icon while it is displayed will cause a routing request to be sent to the service router 225. Upon receiving the routing request, the service router 225 will determine the correct routing of the routing request and deliver the proper service to the client computer 170.

Figure 3:
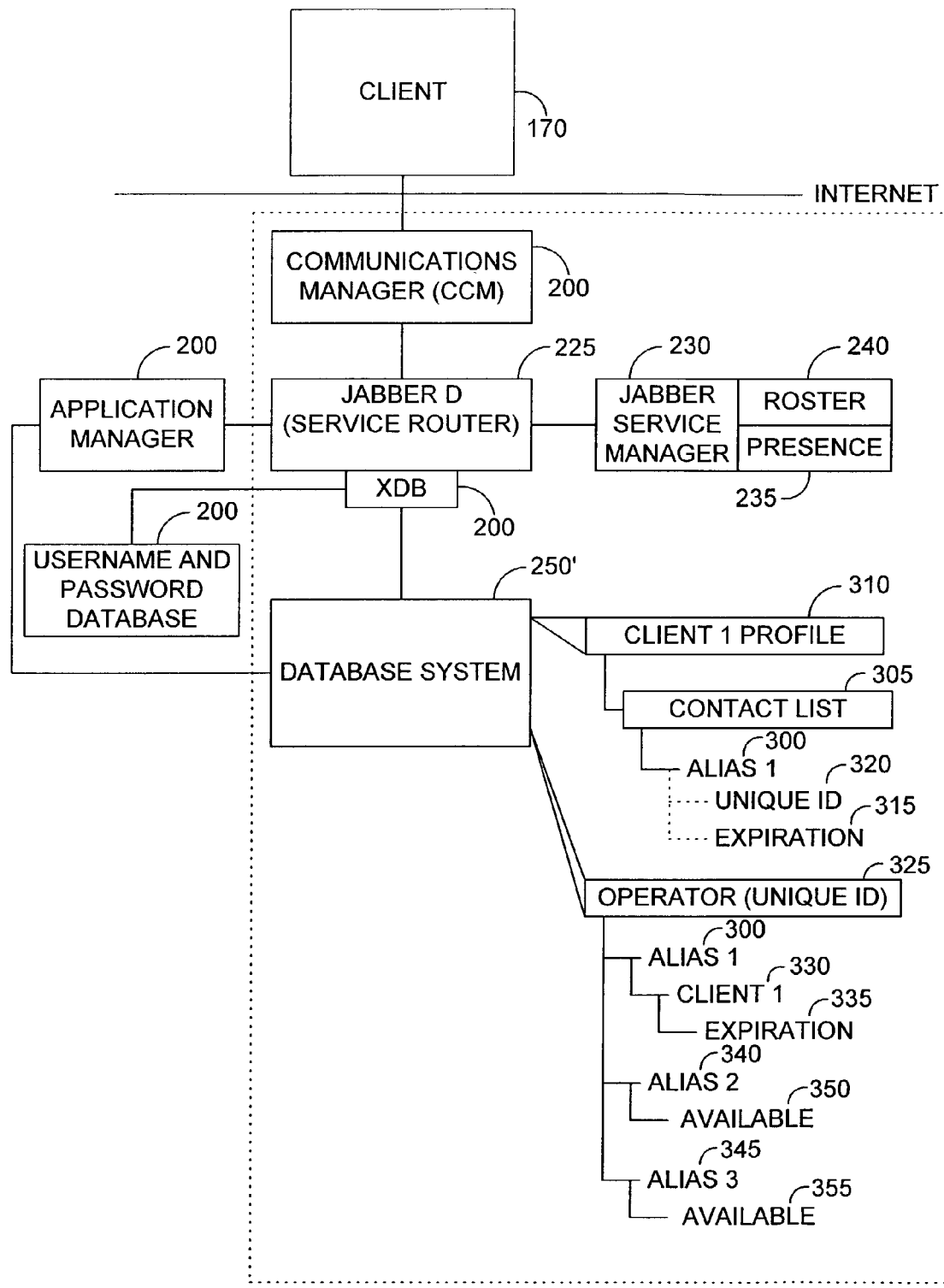
FIG. 3 is a block diagram showing an embodiment, among others, of a system of the present invention for providing temporary aliasing.

Referring now to FIG. 3, shown is an embodiment, among others, of a system of the present invention for providing temporary aliases. Here, a database system 250' located inside the universal server 130 can include storing temporary aliases 300 to allow interaction between client 170 users for a period of time. Such a system is particularly useful in the service industry wherein a customer may call to request customer service. A service ticket is opened upon receipt of the customer call and the service operator can assign a temporary alias 300 that can be added to the resource list 305 in the customer profile 310. The expiration 315 of the temporary alias 300 can be set by the service operator, linked to the closing of a service ticket, or the expiration 310 can be set to a default date/time extendable by the service operator. Thus, the resource list 310 in the database system 250' will include an alias 300 corresponding to the service operator assigned to the service ticket.

In various embodiments, the service operator could be an administrator of the network, with access to the database system 250' through a server (not shown). However, in an alternative embodiment, among others, the service operator could be merely another user of the network 110. Jabber typically allows a first user to add themselves to the resource list of a second user. However, in other alternative embodiment, the second user may be prompted by the database system to approve the addition of the first user to the second user's profile.

Moreover, the alias 300 stored in the database system 250' can be linked to a unique identifier 320, e.g. JID or e-mail address, and can be linked to the expiration date/time 315. Moreover, the unique identifier 320 and the expiration period 315 would remain hidden and un-modifiable by the customer. Thus, once the ticket was closed or the expiration 315 expired, the customer could no longer access the service operator, although a log (not shown) could be stored such that an operator could be located in the event of any problems arising or further work needed.

In one embodiment, among others, of the present invention, the resource list 305 is sent to the service manager 230 upon login by the client 200. Upon receiving the resource list 305 the service manager 230 could examine the resource list for expiration of any of the contacts 300. If a contact 300 has expired the service manager 230 could send a request to the database system 250' to remove the contact 300 from the user profile 310. Thus, the resource list 305 sent to the client 170 will not include the expired temporary alias 300.

In an alternative embodiment, among others, a server (not shown) could be attached to the database system 250' which monitors the expiration of a plurality of temporary aliases. Then when an alias 300 expires the server can automatically remove the temporary alias 300 from the user profile 310. Thus, the next time the user logs in to the universal server 130, the resource list 305 sent to the client 170 will not include the temporary alias 300.

In other alternative embodiments, among others, of the present invention, an alias 300 provided by the service operator could be linked to the operator's profile 325 which could contain a plurality of aliases 300, 340, 345. Each of these plurality of aliases would be linked to a status 330, 350, 355 which indicates the availability of the particular temporary alias 300, 340, 345. When a temporary alias 300 has been issued to a user profile 310, the alias can be linked to that user profile. Moreover, the temporary alias 300 may also be linked to the expiration date 335, such that when the alias 300 expires, the service operator can trigger the removal of the alias 300 from the customer profile 310.

Alternatively, the particular alias 300 assigned could remain actively linked by the customer profile 310 until the operator reassigned the alias 300 to another customer. Thus, an expiration 315, 335 would be unnecessary to trigger the removal of the alias 300 from the customer profile 310. The alias 300 would be removed from the customer profile 310 upon reassignment, and the temporary alias 300 would no longer appear as a resource when the customer logs-on to the universal server 130.

Figure 4:
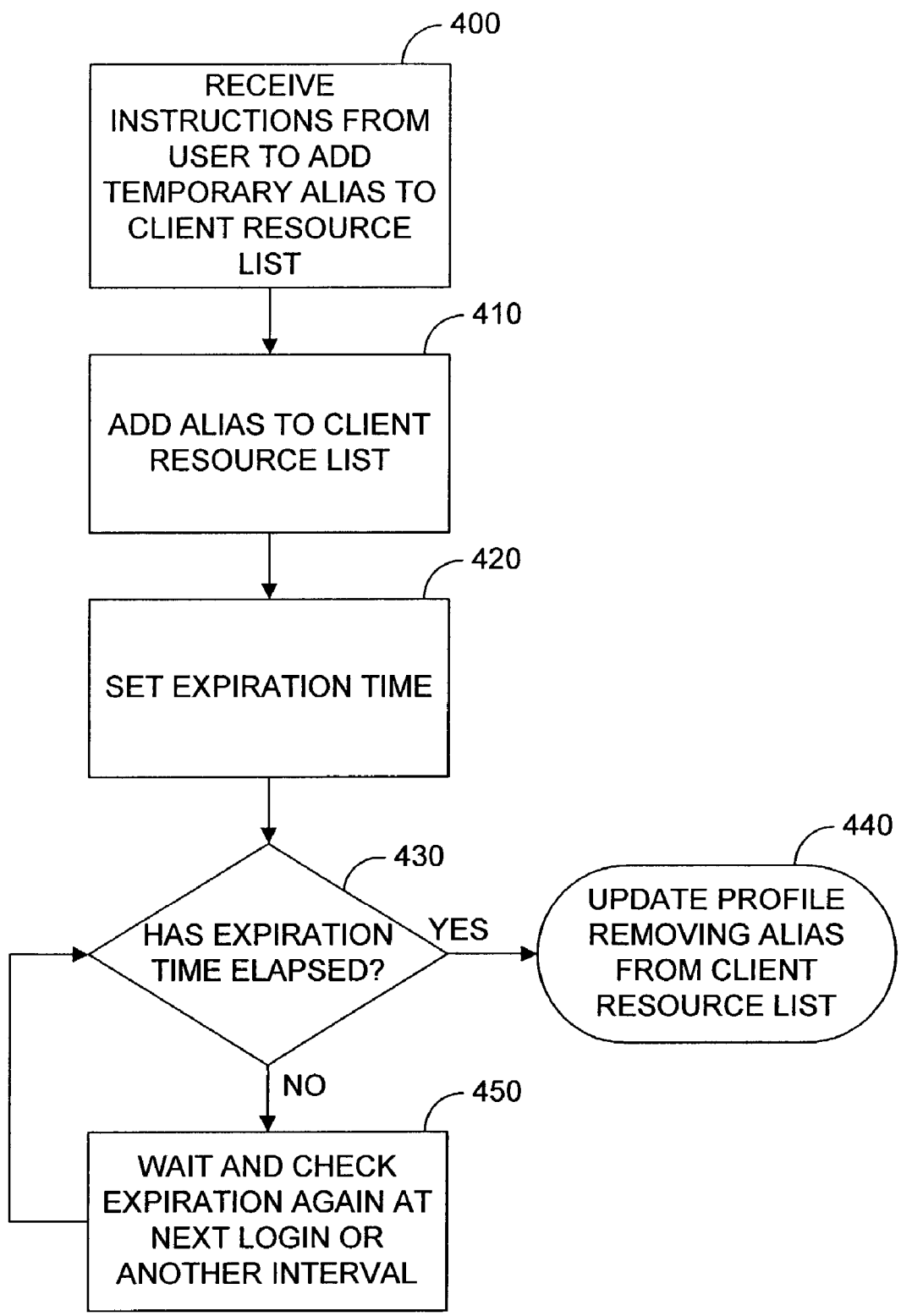
FIG. 4 is a flowchart illustrating an embodiment, among others, of the operation of the system for providing temporary aliasing of FIG. 3.

Referring now to FIG. 4, shown is an embodiment, among others, of a flowchart illustrating the operation of the system for temporary aliasing shown in FIG. 3. In the first step 400, the database system 250' receives instructions from a service operator to add a temporary alias 300 to a client resource list 305. The database system 250' adds the temporary alias 300 to the client resource list 305 in the next step 410, and sets an expiration date/time 315. In the next step 420, a server (not shown) coupled to the database system 250' checks to see whether the expiration date/time 315 has expired. If the expiration date/time 315 has not expired, in accordance with the next step 430, the database server waits to check the expiration date 315 again the next time the customer logs-in or at another interval. One skilled in the art will understand that the check can occur at both or either of the above events. Furthermore, the interval can be set to check every hour, every twelve hours, once per day, etc. When the expiration date/time 315 has finally elapsed, the server will instruct the database system 250' will update the customer resource list 305 to remove the temporary alias 300 from the resource list 305 of the customer.

In an alternative embodiment, among others, of the present invention, the service manager 230 can be set up to check the expiration 315 of the temporary alias 300 upon reading the resource list 305 from the database system 250'. While checking the presence and availability of the contacts included in the resource list 305, the service manager 230 can check the contacts for any expirations 315 that may exist. Upon finding an expired contact 300, the service manager 230 can instruct the database system 250' to remove the temporary contact 300.

In further alternative embodiments, among others, of the present invention, the service operator can be given the opportunity to remove the temporary alias 300 from the user resource list 305. The service operator could also alter a unique identification associated with the alias 300 such that the link contained to the unique identification 320 in the resource list 305 is no longer valid. One skilled in the art will recognize a number of data structures and systems that can be used to facilitate the creation of a temporary identification in accordance with the present invention. Each of these alternative structures and systems are intended to be included within the present invention.

Process and function descriptions and blocks in flow charts can be understood as representing, in some embodiments, modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should be emphasized that the above-described embodiments of the present invention are merely possible examples of implementations set forth for a clear understanding of the principles of the invention. Many variations and modifications may be made to the above-described embodiment(s) of the invention without departing substantially from the principles of the invention. All such modifications and variations are intended to be included herein within the scope of this disclosure and the present invention and protected by the following claims.

What is claimed is:

1. A system for providing temporary aliasing, comprising:
   a database system operable to store a plurality of network profiles, each network profile being associated with a user, the database system being further operable to provide a first user with a temporary alias to allow the first user to add the temporary alias to a resource list in the network profile associated with a second user, the resource list comprising aliases of other users to which the second user can send communication messages wherein aliases from the resource list are provided to the second user, the aliases comprising at least said temporary alias which is linked to a messaging address of the second user and an expiration period for the temporary alias and at least a non-temporary alias which is linked to a messaging address of a third user and excludes a designated expiration period, whereby the second user can select one of the aliases from the network profile of the second user to request communications with a user associated with the selected alias and wherein the expiration period is for longer than a single chat session; and
   a service manager coupled to the database system for managing the temporary alias of the first user within the resource list of the second user.

2. The system of claim 1, wherein the temporary alias is removed after a pre-determined period of time by the service manager.

3. The system of claim 1, wherein the expiration period associated with the temporary alias for removal of the temporary alias is set by the first user when the first user allows addition of the temporary alias to the network profile of the second user.

4. The system of claim 1, wherein the first user is a service technician assigned to help the second user.

5. The system of claim 4, wherein the expiration period for removal of the temporary alias expires at the end of a service ticket opened upon a service call from the second user.

6. The system of claim 1, wherein the database system is operable to provide the first user with a plurality of temporary aliases.

7. The system of claim 6, wherein a service technician is the first user, and uses the plurality of temporary aliases to limit open service tickets.

8. The system of claim 1, wherein the temporary alias is associated with a username of the first user in the database system.

9. The system of claim 8, wherein the username of the first user is not viewable by the second user.

10. The system of claim 8, wherein the username is an e-mail address.

11. The system of claim 8, wherein the username is an instant messaging identification.

12. The system of claim 11, wherein the temporary alias is different than the instant messaging identification.

13. The system of claim 1, further comprising:
    an application server having an administrative tool allowing the first user to modify the network profile of the second user to add the temporary contact to the network profile of the second user.

14. The system of claim 1, further comprising:
    means for allowing the first user to add the temporary alias to the network profile of the second user.

15. The system of claim 1, further comprising:
    a service router coupled to the database system and the service manager and operable to provide routing of requests from the second user.

16. The system of claim 15, further comprising:
    a remote terminal associated with the second user and coupled to a network; and
    the network being coupled to the service router.

17. A method for temporary aliasing, comprising:
    creating a temporary alias associated with a messaging address of a first user; and
    providing a second user with the temporary alias to be stored in a resource list of a network profile associated with the second user, the resource list comprising aliases of other users to which the second user can send communication messages wherein aliases from the resource list are provided to the second user, the aliases comprising at least said temporary alias which is linked to a messaging address of the first user and an expiration period for the temporary alias and at least a non-temporary alias which is linked to a messaging address of a third user and excludes a designated expiration period, whereby the second user can select one of the aliases from the network profile of the second user to request communications with a user associated with the selected alias and wherein the expiration period is for longer than a single chat session.

18. The method of claim 17, further comprising:
    deleting the temporary alias after the expiration of a pre-determined period of time.

19. The method of claim 17, further comprising:
    adding the expiration date to the temporary alias, upon expiration of which, the temporary alias can be deleted.

20. The method of claim 17, wherein the first user is a service person assigned a service ticket upon receiving a service call from the second user.

21. The method of claim 20, further comprising:
deleting the temporary alias from the network profile when the service ticket associated with the second user is closed.

22. The method of claim 17, further comprising:
creating a plurality of temporary aliases associated with the messaging address of the first user.

23. The method of claim 22, wherein the first user is a service person assigned a service ticket upon receiving a service call from the second user, the method further comprising:
limiting the number of service tickets that can be opened by the service person according to the number of temporary aliases allowed.

24. The method of claim 17, further comprising:
hiding the messaging address from the second user.

25. The method of claim 24, wherein the messaging address is an e-mail address associated with the first user.

26. The method of claim 24, wherein the messaging address is an instant messaging identification.

27. The method of claim 25, wherein the temporary alias is different than the messaging address.

28. The method of claim 17, further comprising:
adding the temporary alias to the network profile of the second user automatically.

29. The method of claim 17, further comprising:
receiving a request from the first user to add a temporary alias to the network profile of the second user; and
adding the temporary alias to the network profile of the second user.

30. A method for interacting with clients, comprising:
creating a temporary alias of a first user with an expiration date for a client, the temporary alias to be used by the client in communicating with the first user; and
sending the temporary alias to the client along with other aliases available to the client, whereby a user of the client can select an alias in order to request communications with another user associated with the selected alias, the aliases available to the client comprising at least one temporary alias which is linked to a messaging address of the first user and an expiration period for the temporary alias and at least one non-temporary alias which is linked to a messaging address of a third user and excludes a designated expiration period, wherein the expiration period is for longer than a single chat session.

31. The method of claim 30, further comprising:
extending the expiration date of the temporary alias.

32. The method of claim 31, further comprising:
adding the temporary alias to a network profile associated with the client.

33. The method of claim 30, further comprising:
interacting with the client while the temporary alias has not expired.

34. The method of claim 30, further comprising:
receiving a service call from a client; and
deleting the temporary alias after completing the service call.

* * * * *